US011411397B2

(12) United States Patent
Christ

(10) Patent No.: US 11,411,397 B2
(45) Date of Patent: Aug. 9, 2022

(54) POLARITY REVERSAL PROTECTION CIRCUIT

(71) Applicant: Continental Automotive GmbH, Hannover (DE)

(72) Inventor: Dominic Christ, Mespelbrunn (DE)

(73) Assignee: Continental Automotive GmbH

( * ) Notice: Subject to any disclaimer, the term of this patent is extended or adjusted under 35 U.S.C. 154(b) by 699 days.

(21) Appl. No.: 16/322,861

(22) PCT Filed: Jul. 25, 2017

(86) PCT No.: PCT/EP2017/068770
§ 371 (c)(1),
(2) Date: Feb. 1, 2019

(87) PCT Pub. No.: WO2018/024544
PCT Pub. Date: Feb. 8, 2018

(65) Prior Publication Data
US 2021/0391715 A1  Dec. 16, 2021

(30) Foreign Application Priority Data
Aug. 2, 2016 (DE) ...................... 10 2016 214 285.2

(51) Int. Cl.
*H02H 11/00* (2006.01)
(52) U.S. Cl.
CPC ................................ *H02H 11/003* (2013.01)
(58) Field of Classification Search
CPC .......... H02H 7/0844; H02H 7/18; H02H 7/26; H02H 7/268; H02H 7/0827; H02H 3/18;
(Continued)

(56) References Cited
U.S. PATENT DOCUMENTS
6,611,410 B1    8/2003   Makaran
2005/0218964 A1  10/2005  Oswald et al.
(Continued)

FOREIGN PATENT DOCUMENTS
CN    202872363 U    4/2013
CN    204424894 U    6/2015
(Continued)

OTHER PUBLICATIONS
Office Action dated xx Jul. 3, 2017 from corresponding German Patent Application No. 10 2016 214 285.2.
(Continued)

*Primary Examiner* — Bryan R Perez

(57) ABSTRACT

A polarity reversal protection circuit includes a MOSFET and a turn-off circuit, which turns off the MOSFET in the case of a polarity reversal. The turn-off circuit includes a detector for detecting the case in which the voltage at the source terminal of the MOSFET undershoots the voltage at the drain terminal of said MOSFET. Furthermore, it includes a quick-break switch for turning off the MOSFET in the event of detected voltage undershooting, a comparator for comparing the voltages present at source terminal and drain terminal of the MOSFET after detected voltage undershooting, wherein the output of the comparator is connected to the gate terminal of the MOSFET, a boost converter, a buck converter and a charge pump for voltage supply, and a switch for switching off the comparator.

6 Claims, 2 Drawing Sheets

(58) Field of Classification Search
CPC ...... H02H 3/20; H02H 11/003; H02H 11/002; H02H 1/0007; H02H 1/06
See application file for complete search history.

(56) References Cited

U.S. PATENT DOCUMENTS

2009/0303647 A1    12/2009  Bauer et al.
2014/0029146 A1*    1/2014  Pavlin .................. H01L 27/088
                                                          361/84

FOREIGN PATENT DOCUMENTS

| DE | 19817790 A1 | 12/1999 |
| DE | 10048592 A1 | 5/2002 |
| DE | 102006006878 A1 | 7/2007 |
| DE | 102009007818 A1 | 8/2010 |
| DE | 102011057002 A1 | 6/2013 |
| DE | 102015220953 A1 | 6/2016 |
| EP | 1978617 A1 | 10/2008 |

OTHER PUBLICATIONS

International Search Report and Written Opinion dated Nov. 20, 2017 from corresponding International Patent Application No. PCT/EP2017/068770.

\* cited by examiner

POLARITY REVERSAL PROTECTION CIRCUIT

BACKGROUND

The present invention relates to a polarity reversal protection circuit comprising a MOSFET. Such a circuit is used for example for protecting electrical circuits in motor vehicles against incorrect terminal connection of the battery voltage.

DE 198 17 790 A1 discloses a polarity reversal protection circuit comprising a MOSFET and a turn-off circuit, which turns off the MOSFET in the case of a polarity reversal. What should be regarded as disadvantageous about this known polarity reversal protection circuit is that the MOSFET requires a charge pump. This leads to a permanently flowing quiescent current, and energy consumption associated therewith. Alternative solutions that manage with reduced quiescent current have the disadvantage of not ensuring reliable polarity reversal protection in all situations.

BRIEF SUMMARY

It is an object of the invention to propose an improved polarity reversal protection circuit by comparison therewith. This object is achieved by means of the measures specified in the characterizing part of the independent claims.

The polarity reversal protection circuit according to the invention comprises a detector for detecting a voltage under-shooting between source terminal and drain terminal of the MOSFET. A voltage under-shooting that is associated with an edge and occurs in the event of a polarity reversal, for example, is thus detected rapidly and reliably. In the case of a voltage undershooting, a quick-break switch turns off the MOSFET. A comparator is provided in order to compare the voltages present at drain terminal and source terminal of the MOSFET. The output of the comparator is connected to the gate terminal of the MOSFET in order to turn on the latter again if a polarity reversal is no longer present. A boost converter is provided for voltage supply even in the case of a supply voltage drop, and a buck converter for the voltage supply of consumers connected downstream. If no polarity reversal is present, the comparator is switched off via a switch. The solution according to the invention has the advantage that only in the case of a detected voltage under-shooting are energy-consuming components switched on in order to turn off the MOSFET and to turn the latter on again in the event of the correct voltage being reestablished. Permanently flowing quiescent currents such as occur in the prior art cited are not generated during normal operation. Current does not flow through comparator and detector in the event of correct voltage at the MOSFET. The boost and buck converters that are also active in this operating state are available for supplying consumers connected downstream, that is to say further elements of the circuit protected by the polarity reversal protection circuit. Their operation is therefore desirable anyway, and does not bring about an additional energy consumption.

Preferably, the MOSFET is an N-channel MOSFET. This has the advantage that, by comparison with a P-channel MOSFET, an N-channel MOSFET enables faster switching on again and, as a result, lower losses are brought about at the intrinsic diode of the MOSFET and a high voltage drop occurring at the intrinsic diode is avoided. Problems at circuit blocks connected downstream are avoided as a result.

According to the invention, the switch is designed as a switch-off delay unit. The resultant hysteresis upon switch-off has the advantage that the comparator is also still active for a certain time after the reestablishment of the correct polarity between source terminal and drain terminal of the MOSFET and supplies the gate terminal thereof. An undefined state of the MOSFET such as can occur in the event of the correct voltage being reached too slowly is thus avoided. This case of excessively low voltage can occur for example upon actuation of the ignition in a motor vehicle, in the case of the so-called cold start pulse.

In the simplest case, the quick-break switch is configured as a resistor. This has the advantage that the MOSFET is normally off in any operating situation.

A device according to the invention comprises a polarity reversal protection circuit according to the invention. Particularly in the case of combination instruments or control devices which have to be in operation even during a cold start pulse of a motor vehicle, this has the advantage that they are supplied reliably even if the voltage at the MOSFET drops on account of the cold start pulse, and that they are nevertheless reliably protected against polarity reversal.

A method according to the invention for operating a polarity reversal protection circuit comprising a MOSFET comprises the steps specified in the independent method claim. This has the advantages specified above in respect of the device claims.

BRIEF DESCRIPTION OF THE DRAWINGS

Further details of the invention and the advantages thereof can also be gathered from the following description of exemplary embodiments. In the figures in this case.

DETAILED DESCRIPTION

Figure 1:
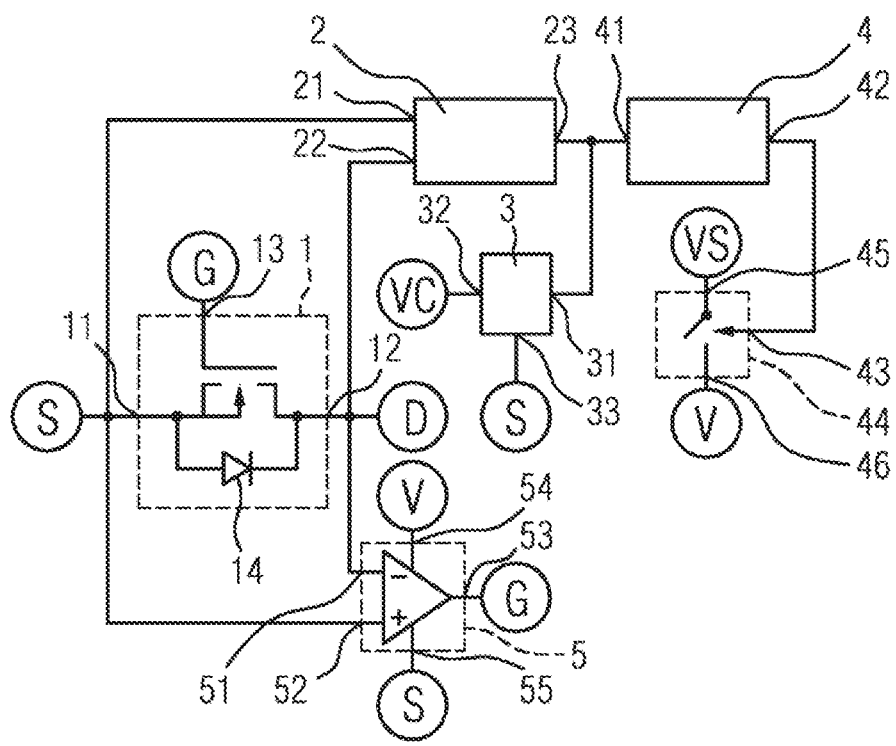
FIG. 1 shows a polarity reversal protection circuit in a block illustration
Figure 1:
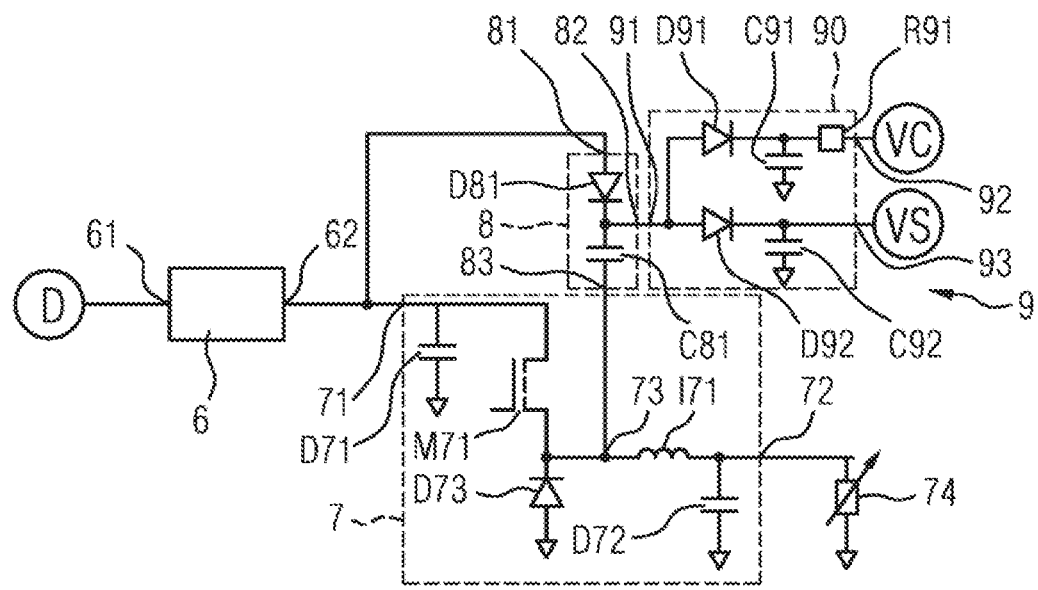

FIG. 1 shows a polarity reversal protection circuit according to the invention in a block illustration. The MOSFET 1 comprises a source terminal 11, a drain terminal 12 and a gate terminal 13. The intrinsic diode 14 of the MOSFET 1 is likewise shown. A detector 2 is connected by its first terminal 21 to the source terminal 11. Its second terminal 22 is connected to the drain terminal 12. The output 23 of the detector 2 is connected to the switching input 31 of a quick-break switch 3 and to the input 41 of a switch-off delay unit 4. The quick-break switch 3 is connected by its terminal 32 to the gate terminal 13 via the node VC via a resistor (not illustrated here), and is connected by its terminal 33 to the source terminal 11 via the node S. The output 42 of the switch-off delay unit 4 is connected to the switching input 43 of a switch 44, the input 45 of which is supplied via the node VS and in the switched state supplies the output 46 thereof and thus the node V.

A comparator 5 is connected by means of its inverting input 51 to the drain terminal 12 of the MOSFET 1. Its noninverting input 52 is connected to the source terminal 11 of the MOSFET 1. The output 53 of the comparator 5 is connected to the gate terminal 13 of the MOSFET 1 via the node G. One supply terminal 54 of the comparator 5 is connected to the node V, and another supply terminal 55 to the node S.

In the lower part of FIG. 1, in the left-hand part the boost converter 6 is shown, which is often also referred to as a booster. Its input 61 is connected to the drain terminal 12 of the MOSFET 1 via the node D, and its output 62 is connected to the input 71 of a buck converter 7 and the first input 81 of a bootstrap circuit 8. The second input 83 of the bootstrap circuit 8 is connected to a switching node 73 of the buck converter 7. At the output 72 of the buck converter 7, a load 74 is illustrated as a placeholder for consumers or circuit blocks connected downstream. A charge pump circuit 90 is connected via its terminal 91 to the center tap 82 of the bootstrap circuit 8. An output 92 of the charge pump circuit 90 supplies the node VC, and an output 93 supplies the node VS. The charge pump circuit 90 comprises diodes D91, D92, capacitors C91, C92 and resistors R91 in a known manner. The bootstrap circuit 8 and the charge pump circuit 90 together form the charge pump 9. The buck converter 7 comprises diodes D71, D72, D73, an inductance 171 and a transistor M71.

In other words the invention is based on the concept of replacing a diode of a polarity reversal protection circuit by a MOSFET 1, the intrinsic diode 14 of which performs the diode function and which turns on in the event of voltage in the forward direction and thus reduces losses at the intrinsic diode 14. The MOSFET 1 is designed as an N-channel MOSFET. Said N-channel MOSFET is linked by its source terminal 11 to the positive side of the voltage supply and by its drain terminal 12 to the load 74. The MOSFET 1 is thus incorporated "High Side" into the overall circuit.

The voltages at the source terminal 11 and at the drain terminal 12 are fed to a comparator 5, which is designed here as a differential amplifier. Said differential amplifier is switched off during normal operation. In addition, the voltages at the drain terminal 12 and at the source terminal 11 are monitored by a detector 2, which detects a fast edge at the source terminal 11. If an edge occurs, then the gate terminal 13 of the N-channel MOSFET is discharged and the supply voltage for the differential amplifier is switched on. If the voltage at the source terminal 11 is greater again than the voltage at the drain terminal 12, the MOSFET 1 is turned on again. The differential amplifier is then switched off again.

The differential amplifier, the comparator 5 and the detector 2 do not require connection to ground and are therefore also unable to cause a permanent current flow from supply to ground. The differential amplifier is used to switch the N-channel MOSFET on again as soon as the voltage at the source terminal 11 is greater—or greater again—than the voltage at the drain terminal 12. This takes place as rapidly as possible through the use of the comparator 5. This fast switching on again constitutes an improved behavior compared with known solutions. If a P-channel MOSFET is used, for example, then switching on again lasts hundreds of microseconds. Only the intrinsic diode 14 of the MOSFET 1 is conducting in this time. The high voltage drop in this state often poses a problem for the circuit blocks connected downstream, represented here by the load 74. In addition, in the case of very low input voltages, for example a 3.2 V cold start pulse, the problem arises that a sufficient gate-source voltage for completely turning on the MOSFET 1 is no longer available.

According to the invention, the components already present in the motor vehicle system are concomitantly used such that an improvement is obtained without great additional outlay. One property of said motor vehicle systems is the presence of a so-called preboost, of a step-up converter, of the boost converter 6, which becomes active only if the battery voltage drops to a great extent. This is the case for example upon the cold start. Connected downstream of the boost converter 6 is a step-down converter, the buck converter 7, which permanently supplies the motor vehicle system with voltage during normal operation. Both converters 6, 7, or components having a corresponding function, are necessary for the operation of the polarity reversal protection circuit according to the invention: The boost converter 6 ensures that enough input voltage is always available for the buck converter 7 connected downstream. This supply voltage is also used for generating the operating voltage for the active diode, the MOSFET 1. In this way it is ensured that even in the case of input voltages that are actually too low, the MOSFET 1 is turned on sufficiently.

In the buck converter 7, a voltage that is divided between at least two separate voltages is generated according to the bootstrap method. One of these voltages charges a relatively large capacitor C92, which is used as supply for the comparator 5. The negative supply voltage terminal 55 of the comparator 5 is connected to the source potential of the N-channel MOSFET. The second voltage is led via a series resistor R11 to the gate terminal 13 of the N-channel MOSFET. In this way the MOSFET 1 is permanently turned on during normal operation.

Since the differential amplifier, and thus the comparator 5, is switched off in normal operation and its reference potential is connected to the source terminal 11, in normal operation a relevant quiescent current does not occur, in particular not with respect to ground.

In the case of known solutions, a momentary undesired switch-off of the transistor can occur. This is the case firstly if a P-channel MOSFET is no longer completely turned on in the event of very small input voltages. Secondly, there are integrated circuits which indeed likewise operate without connection to ground and thus in a manner free of quiescent current, but rely on momentarily switching off a MOSFET in order to recharge their capacitors. Neither is the case for the solution according to the invention.

Figure 2:
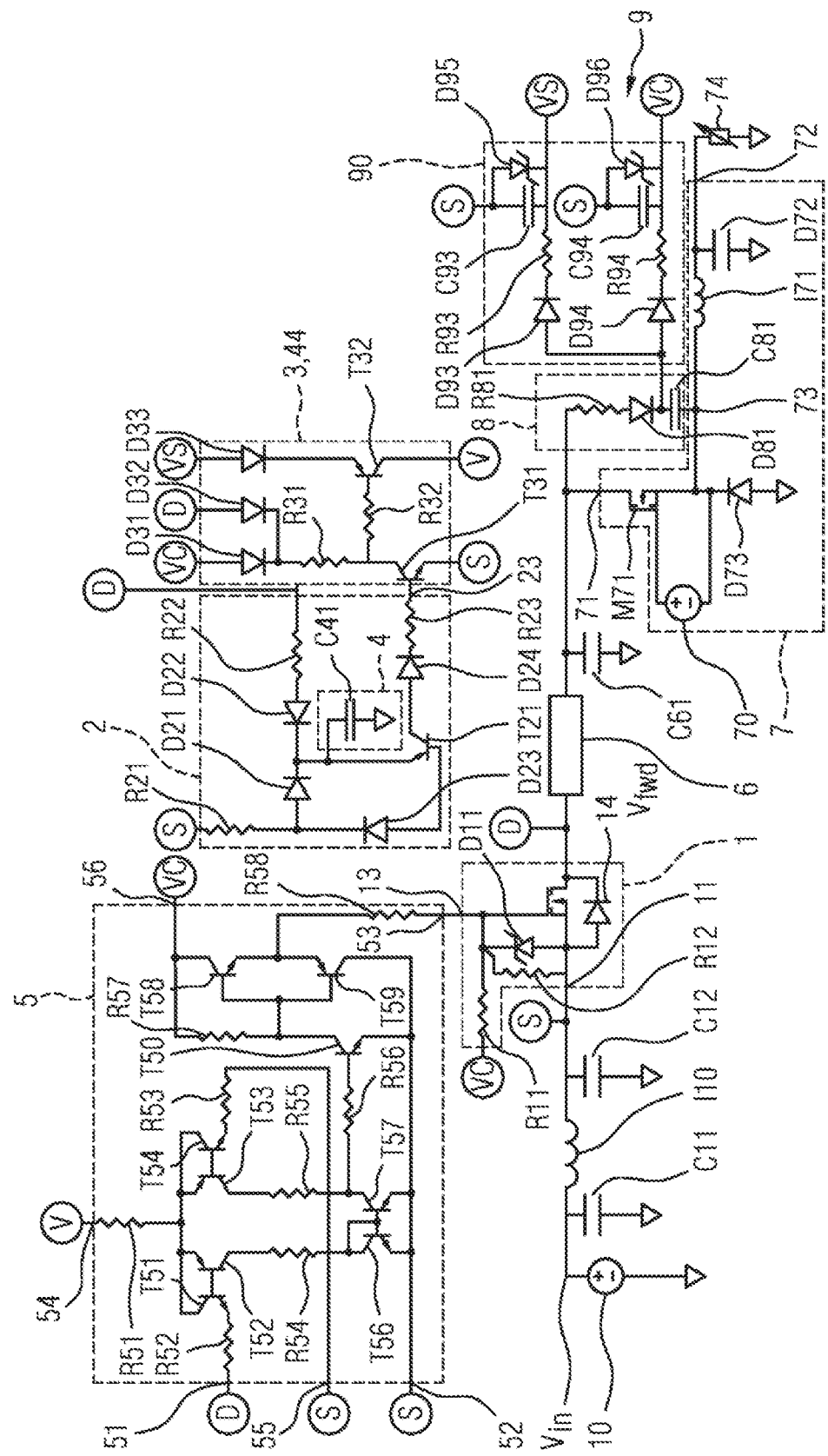
FIG. 2 shows a circuit diagram of a polarity reversal protection circuit

FIG. 2 shows an exemplary circuit diagram of a polarity reversal protection circuit according to the invention. It reveals the MOSFET 1, the detector 2, the comparator 5, the boost converter 6, the buck converter 7 and the charge pump 9 consisting of bootstrap circuit 8 and charge pump circuit 90. Quick-break switch 3 and switch 44 are illustrated in one block.

The comparator 5 is illustrated as a discretely constructed differential amplifier with an impedance converter connected downstream. The differential amplifier comprises transistors T51 to T57 and resistors R51 to R57 in a known manner. Its inverting input 51 is connected to the node D, and its noninverting input 52 to the node S. The supply terminal 54 is connected to node V, and the supply terminal 55 to node S. The impedance converter is constructed from transistors T50, T58, T59 and resistors R56 to R58 in a known manner. Its output 53 is connected to the gate terminal 13 of the MOSFET 1, and it is supplied by the node VC via the terminal 56. The node G situated between output 53 and gate terminal 13 is not illustrated here. If the comparator 5 is switched off, the gate terminal 13 of the MOSFET 1 is driven via a resistor R11 and a diode D11. Alternatively, this can also be carried out via a resistor R12, but then with a small leakage current. Furthermore, the intrinsic diode 14 is illustrated.

The source terminal 11 of the MOSFET 1 is connected to the voltage supply 10 here for example via an inductance I10 and capacitors C11, C12.

The detector 2 comprises a transistor T21, diodes D21 to D24 and resistors R21 to R23. The switch-off delay unit 4 is illustrated here by means of a capacitor C41. The capacitor C41 ensures that the transistor T21 remains in the on state. It thus constitutes a central element. The quick-break switch 3 and the switch 44 are illustrated in one common block; they comprise transistors T31, T32, resistors R31, R32 and diodes D31 to D33.

Here, as an alternative to FIG. 1, the buck converter 7 is connected to the output of the boost converter 6 via a capacitor C61. The transistor M71 is switched via a voltage supply 70; its drain terminal is connected to the input 71, and its source terminal to ground via the diode D73. The other components correspond to those illustrated with regard to FIG. 1. As an alternative to FIG. 1, the bootstrap circuit 8 comprises an additional resistor R81; the diode D81 and the capacitor C81 are unchanged. The charge pump 9 comprises diodes D93 to D95, resistors R93, R94 and capacitors C93, C94.

The manner of operation of the polarity reversal protection circuit according to the invention with an active diode free of quiescent current, the MOSFET 1, is as follows: Before the first switch-on, the capacitors C41 and C94 are discharged. Therefore, the gate-source junction of the MOSFET 1 is also discharged. If, upon the connection of the supply voltage Vin, the positive pole of the connected voltage is present at the source terminal 11 of the MOSFET 1, then the intrinsic diode 14 of the MOSFET 1 is turned on. The voltage at the drain terminal 12 of the MOSFET 1 therefore rises to Vin-Vfwd. Vfwd hereinafter denotes the forward voltage of the intrinsic diode 14. The overall system consists of the polarity reversal protection circuit according to the invention, a boost converter 6, which is activated in the event of a sufficiently large decrease in the voltage at the drain terminal 12 in order to supply the downstream buck converter 7 with a sufficient input voltage. The buck converter 7, which is present anyway in the overall system, begins to operate. In this case, the voltage at the cathode of the diode D73 changes between (Vin-Vfwd) and approximately −0.7V. If the −0.7V is present at the switching node 73, then the capacitor C81 is charged to approximately the voltage Vin-Vfwd. If the voltage at the cathode of the diode D73 rises again to Vin-Vfwd, then the voltage at the anode of the diode D94 rises to approximately double Vin-Vfwd. The capacitor C94 is charged via the resistor R94. Since the negative terminal of the capacitor C94 refers to the node S, the re-sulting voltage at the node VC across said capacitor C94 in the static state is approximately Vin. The gate-source junction of the MOSFET 1 is charged to Vin via the resistor R11. Consequently, the MOSFET 1 is turned on, as a result of which the voltage drop across the MOSFET 1 decreases to zero or almost zero. The capacitor C41 is charged to the input voltage Vin after switch-off apart from a diode voltage. As a result, the base-emitter voltage of the transistor T21 has approximately the value +0.7V. Consequently, the PNP transistor T21 remains turned off. Since no current thus flows into the base of the NPN transistor T31, the latter also remains turned off. This has the effect that the base-emitter junction of the PNP transistor T32 has the voltage value 0V, which is why the transistor T32 is also turned off. This has the effect that the differential amplifier of the comparator 5 is not supplied with current. Since the base of the NPN transistor T50 is thus not supplied with current either, the PNP transistor T59 remains turned off. Since all transistors with the exception of the MOSFET 1 are turned off, the circuit requires no quiescent current in normal operation with the exception of the gate-source leakage current of the MOSFET 1, which is usually less than 100 nA. As long as the boost converter 6 is able to provide a sufficiently high input voltage for the buck converter 7, a sufficient voltage supply of the charge pump 9 is also ensured. In this way, the presented circuit is able to provide a sufficiently high gate-source voltage for the MOSFET 1 in order to be able reliably to turn the latter on.

If the voltage at the node S falls more rapidly than the RC time constant of the capacitances at the node D and of the load connected there, then the transistor T21 becomes conducting in the region of the voltage supply of the differential amplifier and of the impedance converter as soon as the voltage at the node S is at least 0.6V less than the voltage at the node D. Consequently, the transistor T31 becomes conducting, and in turn the latter turns on the transistor T32. In this way, the comparator 5 is supplied with current. The comparator 5 compares the voltages at source terminal 11 and drain terminal 12 with one another. As long as the voltage at the drain terminal 12 is greater than the voltage at the source terminal 11, the comparator 5 passes a positive voltage to the base series resistor R56 of the transistor T50, which thus begins to conduct. The impedance converter connected downstream and comprising the transistors T58, T59 ensures that the gate-source junction of the MOSFET 1 is discharged. In this way, the MOSFET 1 is turned off. At the same time, the capacitor C94 is also discharged. For the case where the decrease of Vin arises as a result of, for example, the switch-off of the overall system by a superordinate switch, the polarity reversal protection circuit is brought to an inherently safe state. As long as no voltage is present across the capacitor C94, the MOSFET 1 cannot be turned on. In the case of a polarity reversal then taking place, the MOSFET 1 is directly turned off and the overall system is protected against polarity reversal. A condition for this behavior is that the input voltage decreases rapidly compared with the time constant, defined by the load and the capacitances present in the overall system. If the intention is to cover even a slow decrease with subsequent polarity reversal, then an additional pull-down resistor R12 is inserted into the gate-source junction. A small quiescent current occurs in that case, however. Alternatively, circuitry measures are possible, for example constructing a switchable resistor made from additional MOSFETs which is activated only in the event of a decrease in the supply voltage. As long as the supply voltage present at the source terminal 11 is still positive, the following holds true: If the voltage at the source terminal 11 actually rises again above the voltage present at the drain terminal 12, then the comparator 5 ensures that the transistor T50 is turned off again. Afterward, the transistor T59 turns off again and the transistor T58 becomes conducting again. The gate-source junction of the MOSFET 1 is charged again via the resistor R11 and the transistor T58. In this way, the MOSFET 1 is turned on again sufficiently rapidly as soon as this is appropriate.

In other words, the polarity reversal protection circuit according to the invention comprises an active diode that is used as a replacement for Si and Schottky diodes in order to reduce the forward voltage. In this case, the active diode is embodied as an N-channel MOSFET and not as a P-channel MOSFET. N-channel MOSFETs require an increased gate-source voltage so as to be turned on. This voltage can be generated by means of a charge pump. The result of this is either a permanently required quiescent current or the fact that the MOSFET has to be momentarily switched off even though it should be switched on at this point in time in order to build up again the required voltage between gate terminal and source terminal. The following problems can occur here individually or in combination: a permanently flowing quiescent current, a momentary undesired switch-off of the MOSFET, insufficiently controllable switching on again of the MOSFET after polarity reversal from a temporal standpoint or, in the event of excessively low input voltages, insufficient turn-on of the MOSFET. The present polarity reversal protection circuit prevents a permanent quiescent current and ensures a reliable turn-on of the MOSFET in the event of low input voltages and sufficiently fast switching on again of the MOSFET after the end of the polarity reversal.

By virtue of the use of a bootstrap circuit, the required gate-source voltage is drawn from the DC-DC converter contained in the system anyway, the combination of boost converter 6 and buck converter 7. If the MOSFET 1 is intended to be switched on permanently, then the comparator 5 is disconnected from the current supply. A quiescent current therefore does not occur. The drive circuit is designed such that the gate-source junction of the MOSFET 1 is automatically charged.

The voltage necessary for the operation of the polarity reversal protection circuit is tapped off downstream of the boost converter 6, which is present in the system anyway. This ensures that a sufficiently high voltage for turning on the MOSFET 1 is always available. A reliable turn-on of the MOSFET 1, even in the event of a low input voltage, is thus ensured.

The comparator 5 present in the polarity reversal protection circuit is activated in the event of polarity reversal and a rapid drop in the input voltage. The comparator 5 compares input voltage and output voltage of the active diode, of the MOSFET 1, and instigates switching on again if the input voltage becomes greater than the output voltage. An additional switching hysteresis is advantageously provided. The comparator 5 remains switched on as long as the voltage provided by the capacitor C41 is greater than the voltage at the source terminal of the MOSFET M1 by at least 0.7V. The bootstrap capacitor C81 is not discharged since it is permanently recharged by the buck converter 7. The bootstrap capacitor C81 is used for charging the gate-source junction of the MOSFET M1 and for generating the operating voltage of the comparator 5. This enables an inherently safe state in which the MOSFET 1 is turned off if the supply of the overall system is switched off. The polarity reversal protection circuit can alternatively also be modified such that the gate-source junction is discharged by way of a resistor R12. A suitable design of the resistor R94 and the capacitor C94 of the charge pump 9 ensures that the MOSFET 1 is always turned off shortly after the buck converter 7, which is present in the system anyway, is switched off. If this measure is implemented, then the MOSFET 1 is always reliably turned off even in the event of a very slow decrease in the supply voltage in conjunction with a subsequent polarity reversal. The polarity reversal protection circuit according to the invention requires no additional quiescent current in the on state of the MOSFET 1. Even in the event of low input voltages, the MOSFET 1 is completely turned on.

Slight modifications or alternative embodiments of the circuit described above are within the ability of the person skilled in the art.

The invention claimed is:

1. A polarity reversal protection circuit comprising a MOSFET and a turn-off circuit, characterized in that the turn-off circuit comprises
  a detector, a first input of which is connected to a source terminal and a second input of which is connected to a drain terminal of the MOSFET, and an output of which is connected to a switching input of a quick-break switch arranged between the source terminal and a gate terminal of the MOSFET,
  a comparator, a first input of which is connected to the source terminal and a second input of which is connected to the drain terminal of the MOSFET, and an output of which is connected to the gate terminal of the MOSFET,
  a boost converter, an input of which is connected to the drain terminal of the MOSFET,
  a buck converter, an input of which is connected to an output of the boost converter, and an output of which is available for supplying a load, and which has a switching node,
  a charge pump, a first input of which is connected to the output of the boost converter and a second input of which is connected to the switching node, and which has a first output connected to the gate terminal of the MOSFET, and
  a switch arranged between a supply terminal of the comparator and a second output of the charge pump.

2. The polarity reversal protection circuit as claimed in claim 1, characterized in that the MOSFET is an N-channel MOSFET.

3. The polarity reversal protection circuit as claimed in claim 1, characterized in that the switch is connected to a switch-off delay unit.

4. The polarity reversal protection circuit as claimed in claim 1, characterized in that the quick-break switch (3) is configured as a resistor (R12).

5. A polarity reversal protection circuit comprising
  a MOSFET and
  a turn-off circuit, which turns off the MOSFET in a case of a polarity reversal, characterized in that the turn-off circuit comprises
  a detector for detecting a case in which a voltage at a source terminal of the MOSFET undershoots a voltage at a drain terminal of said MOSFET,
  a quick-break switch for turning off the MOSFET in the event of detected voltage undershooting,
  a comparator for comparing the voltages present at the source terminal and the drain terminal of the MOSFET (1) after detected voltage undershooting, wherein an output of the comparator is connected to a gate terminal of the MOSFET,
  a boost converter, a buck converter and a charge pump for voltage supply, and
  a switch for switching off the comparator.

6. A device comprising a polarity reversal protection circuit comprising a MOSFET and a turn-off circuit, characterized in that the turn-off circuit comprises
  a detector, a first input of which is connected to a source terminal and a second input of which is connected to a drain terminal of the MOSFET, and an output of which is connected to a switching input of a quick-break switch arranged between the source terminal and a gate terminal of the MOSFET,
  a comparator, a first input of which is connected to the source terminal and a second input of which is connected to the drain terminal of the MOSFET, and an output of which is connected to the gate terminal of the MOSFET,
  a boost converter, an input of which is connected to the drain terminal of the MOSFET,
  a buck converter, an input of which is connected to an output of the boost converter, and an output of which is available for supplying a load, and which has a switching node,
  a charge pump, a first input of which is connected to the output of the boost converter and a second input of which is connected to the switching node, and which has a first output connected to the gate terminal of the MOSFET, and a switch arranged between a supply terminal of the comparator and a second output of the charge pump.

\* \* \* \* \*